United States Patent [19]

Ling

[11] Patent Number: 4,934,824
[45] Date of Patent: Jun. 19, 1990

[54] RECORDING AND REPRODUCTION OF IMAGES

[75] Inventor: William Ling, London, England
[73] Assignee: Aspex Limited, England
[21] Appl. No.: 323,612
[22] Filed: Mar. 6, 1989

Related U.S. Application Data

[63] Continuation of Ser. No. 50,766, filed as PCT GB86/00782 on Dec. 19, 1986, published as WO87/03501, abandoned.

[30] Foreign Application Priority Data

Dec. 24, 1985 [GB] United Kingdom ............... 8531773
May 27, 1986 [GB] United Kingdom ............... 8612746

[51] Int. Cl.$^5$ ............................................. G03B 35/00
[52] U.S. Cl. ........................................ 352/57; 352/45; 352/46; 352/86; 352/66; 352/60; 352/213; 352/43
[58] Field of Search ................. 352/57, 60, 45, 46, 352/86, 66, 213, 43

[56] References Cited

U.S. PATENT DOCUMENTS

| | | | |
|---|---|---|---|
| 1,422,527 | 7/1922 | Berger | 352/87 |
| 1,558,483 | 10/1925 | Kelley | 352/45 |
| 1,744,459 | 1/1930 | Fairall | 352/57 |
| 2,360,322 | 10/1944 | Harrison | 352/60 |
| 2,729,138 | 1/1956 | Bernier | 352/60 |
| 2,738,377 | 3/1956 | Weighton | 352/66 |
| 3,232,166 | 2/1966 | Matagne | 352/57 |
| 3,712,199 | 1/1973 | Songer | 352/60 |
| 4,522,475 | 6/1985 | Ganson | 352/39 |

FOREIGN PATENT DOCUMENTS 24645 of 1911 United Kingdom ............... 352/213

Primary Examiner—Monroe H. Hayes
Attorney, Agent, or Firm—Kirschstein, Ottinger, Israel & Schiffmiller

[57] ABSTRACT

A method of recording an image of an object onto cinematographic color film comprises forming a number of successive images of the object through a single lens system onto each frame of the film, the successive images being recorded in light of different characteristics, for example different colors. In a preferred embodiment, each frame of the film is exposed successively to light of two or three different colors. The film is projected using a conventional projector, and when viewed through spectacles consisting of two appropriate filters gives a stereoscopic effect. The method can be used to produce a film which can also be viewed without spectacles, and is found to give enhanced sharpness and color saturation. The invention also includes a moving film camera having a mechanism for interposing a number of filters in the optical path successively during exposure of each frame so that successive images are overlaid on each frame. In one embodiment a rotatable shutter member having a transparent portion consisting of a number of filters is provided. The shutter member may replace the rotating shutter of a conventional film camera. Several different forms of shutter member are described.

11 Claims, 8 Drawing Sheets

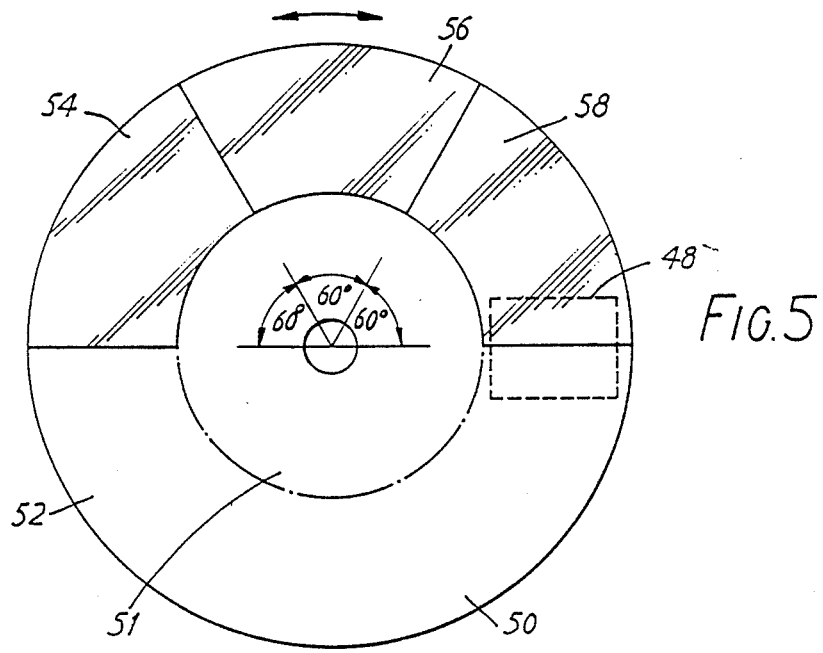
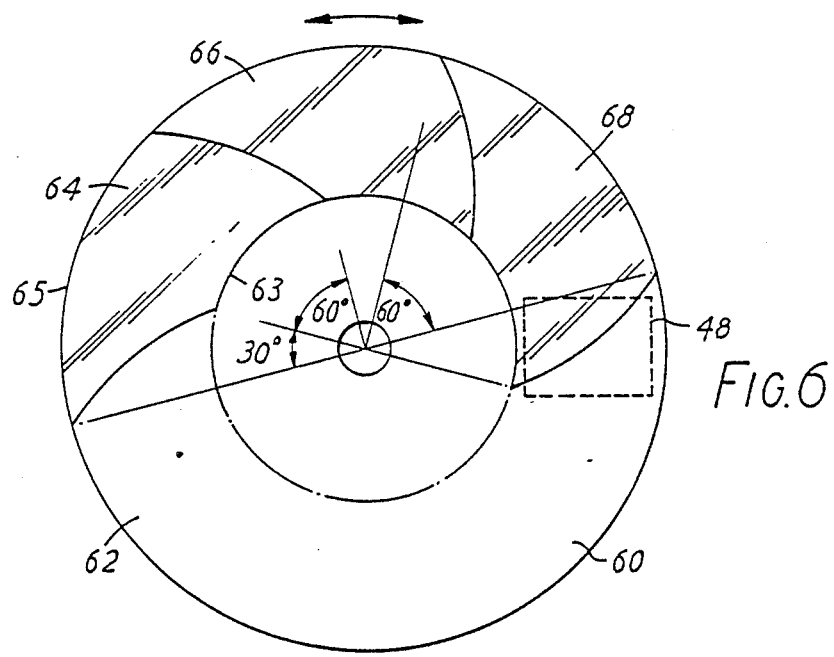

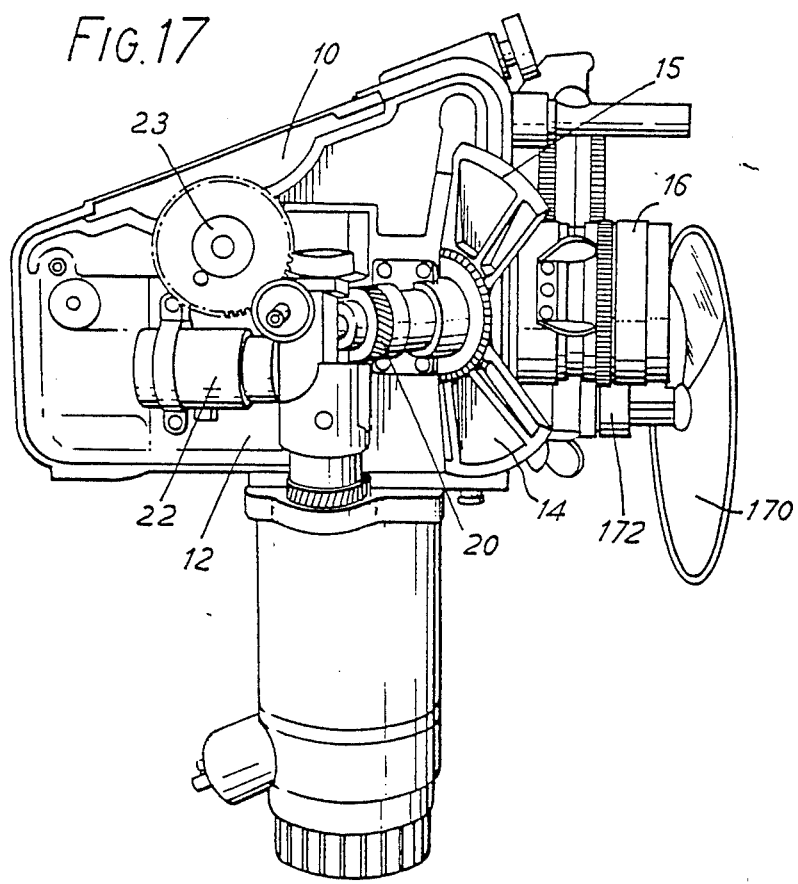
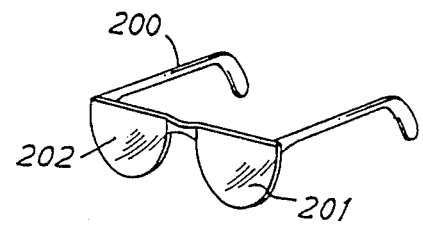

RECORDING AND REPRODUCTION OF IMAGES

This is a continuation, of application Ser. No. 07/50,766 filed as PCT GB86/00782 on Dec. 19, 1986, published as WO87/03501; now abandoned.

BACKGROUND OF THE INVENTION

This invention relates to the recording and reproduction of images.

More particularly, the invention relates to a method of recording images on cinematographic film and a film camera for carrying out the method.

Description of Related Art

Stereoscopic of "3D" moving films have been known for many years. The films have been made by simultaneously filming an object from two different aspects, through two lens systems separated horizontally or vertically from one another or by dividing a single lens system using mirrors, prisms etc. The usual technique has been to use different color filters, for example red and green, with the two lens systems, or split lens system so that red and green images are formed simultaneously on the film. When the film is subsequently shown in the cinema, each member of the audience wears a pair of spectacles with complementarily coloured lenses, so that the two images on the screen are presented separately to the two eyes of the viewer, producing the illusion of a stereoscopic or three dimensional image. Another known technique involves the use of polarising filters instead of color filters, the film being viewed through spectacles with cross-polarising lenses. Disadvantages of the known techniques are that they require specially built or specially adapted cameras which, because of the need for split or separate lens, are bulky and expensive, and that they produce a degraded or double image when the result is viewed without the appropriate spectacles.

Stereoscopic vision relies on the fact that each eye sees a different aspect of the same object. This stems not only from the different positions occupied by the two eyes, but from the fact that there is usually movement in the scene being viewed, or movement of the eyes themselves. A person's head is for a large part of the time in constant movement, as are the eyes within the head, as they constantly scan the scene they are looking at. This causes continuous change in the aspects of the scene being viewed by each eye, which is important in the perception by the brain of the "dimensionality" of objects in the scene. Any movement in the scene, even of a single moving object, will increase the stereoscopic effect, even if the eyes are kept stationary.

The present invention makes use of this effect in producing stereoscopic images, in contrast to the known techniques, which usually rely on the formation of separate images through split or separate lens systems. Swiss patent specification CH-105 935 describes a system for projecting cinematographic films to give an illusion of depth, in which two successive frames of the film are projected simultaneously, through separate projection lenses, onto a screen so that the two frames are overlaid on the screen. The two frames are projected through separate polarising elements set at different angles, and each viewer wears a pair of spectacles containing corresponding polarising elements, so that the right and left eyes see images from the two successive frames. The difference in the images because of movement between the two frames gives the illusion of depth. Such a system requires a specially built projector having two lens systems.

It has been proposed, in an article by R. S. Harris published by Eastman Kodak in the "Kodak Workshop Series", publication No. KW13, to construct a shutter arrangement for a still camera which enables the film to be exposed sequentially to red, green and blue light. If there is movement in the scene being photographed, this will give rise to streaks and swirls of color around moving objects in the photograph, to add a sense of movement or give an interesting visual effect.

SUMMARY OF THE INVENTION

According to one aspect of this invention, there is provided a method of recording an image of an object onto cinematographic film comprising forming a number of successive images of the object through a single lens system onto each frame of film, the successive images being recorded in light of different characteristics.

The characteristics of the light are such as to enable the overlaid images to be distinguished when the images are subsequently reproduced. In the preferred form of the invention, the successive images are recorded in light of different colors. However, it may be possible to record the images in light of different planes of polarisation, provided that the film is capable of recording the polarisation of light forming the image.

In one preferred form of the invention, three successive images are formed, for example in red, blue and green light, or in the complementary colors yellow, cyan and magenta. In another preferred form of the invention, two successive images are formed, for example in combinations of red and blud and of red and green.

In one form of the invention, each frame of the film is exposed through filters successively interposed in the optical path between the object and the film.

The recorded images are subsequently reproduced, for example on a screen, using conventional projection equipment. To enagle the images to be viewed stereoscopically, they may be viewed through a pair of spectacles, each lens of which comprises a filter allowing transmission of light such that the right and left eyes of the viewer see different ones of the successive images or different combinations of the images. For example, if successive images in three colors are employed, each lens may allow transmission of light corresponding to a color complementary to a different one of the three colors of the images and a proportion of light corresponding to a color complementary to the third of the three colors of the images. Alternatively, if the images are formed by the use of polarising instead of color filters, the result can be viewed through spectacles containing cross-polarising lenses. The use of three colors or polarisation enables full-color stereoscopic images to be produced.

It has been found, surprisingly, that the method of the invention can be carried out in such a way that the images reproduced, when viewed by the naked eye, i.e., without the spectacles, do not appear as degraded or double images, but as single full-color images. In fact, it has been found that the images, whether viewed with or without the spectacles, can be improved by the method of the invention, by improving the sharpness of the image as well as the accuracy and saturation of color recorded.

The invention consists, in another aspect, in a moving film camera having a mechanism for interposing a number of filters in the optical path of the camera successively during the exposure of each frame of the film, so that the images formed by light passing through the filters are overlaid on each frame.

In one form of the invention, the mechanism comprises a movable member, the filters forming part of, or being carried by, the movable member, and means for rotating the member so that the filters are brought successively into the optical path of the camera during exposure of each frame of the film. The movable member may for example be a rotatable member. The mechanism may be adapted to be fitted to an existing film camera so that the rotatable member moves in front of, or behind, the camera lens.

In another form of the invention, applicable to a film camera having a mirrored rotary shutter, or a mirrored rotary shutter coupled with a rotary focal plane shutter, the movable mechanism comprises a rotatable shutter member adapted to replace the mirrored rotary shutter, or the rotary focal plane shutter, the shutter member having an opaque portion and portions formed by the filters so that on rotation of the shutter member the opaque portion and the filters are moved successively into the optical path of the camera. If the mirrored rotary shutter is replaced, the opaque portion of the replacement member can also be mirrored on one surface. If the rotary focal plane shutter is replaced the opaque portion can remain black.

The filters may form adjacent sectors of the transparent portion of the shutter member, divided by radii of the shutter member. Alternatively, the boundaries between adjacent filters may be inclined to the radius of the shutter, for example extending spirally, so that adjacent filters "overlap" one another in the direction of rotation. This overlapping is particularly useful in avoiding "fringing" around the edges of the image which may otherwise occur in certain circumstances when the reproduced film is viewed without spectacles.

It has been found that in application of the invention to moving films the separation between the overlaid images is relatively small so that the film can be viewed without the aid of spectacles, though the stereoscopic effect is then of course reduced. In fact, it has been found that the images, whether viewed with or without spectacles, can be improved by use of the invention, in that the sharpness of the images as well as the accuracy and saturation of color recorded are improved.

The invention also includes a cinematographic film bearing images recorded by the method defined above.

BRIEF DESCRIPTION OF THE DRAWINGS

The invention will now be described, by way of example, with reference to the accompanying drawings, in which:

FIGS. 5 to 16 show various shutter members in accordance with this invention, FIG. 17 is a diagrammatic view of a film camera provided with an external shutter mechanism in accordance with another form of the invention, and FIG. 18 is a diagrammatic illustration of spectacles which may be used in one form of the invention.

DETAILED DESCRIPTION OF THE PREFERRED EMBODIMENTS

Figure 4:
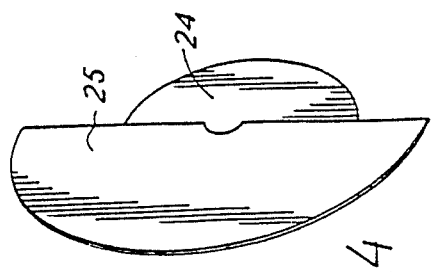
FIG. 4 shows a conventional sector-shaped shutter.

Most conventional film cameras employ a rotating shutter, generally in the form of a sector-shaped or "butterfly" shaped opaque member which may be mirrored on one side, with the axis of rotation set at an angle to the optical axis to allow reflex viewing through the camera eyepiece whilst masking the film during frame advancement. For example, in the camera shown in FIGS. 1 to 3, which is an Arriflex II c (trade mark), a "butterfly" mirrored shutter 14 is mounted in the camera body 12 for rotation about an axis at 45° to the optical axis. The shutter 14 is positioned so that its two opaque portions 15 move alternately into position between the camera lens 16 and the gate 18 through which the film passes. The shutter is driven through gearing 20 from the drive motor 22 which also drives the film advancing mechanism 23, so that the shutter is driven in synchronism with the film advancement. The shutter 14 is mirrored on the surface 17 facing the lens 16, so that when either of the opaque portions is in position, the light from the lens is reflected to the camera eyepiece 19. Various forms of eyepiece, and of mechanism for driving the shutter, will be well known to the skilled man and therefore will not be described in detail. FIG. 4 shows a sector-shaped rotary shutter 24 having a single opaque portion 25, which may be mirrored on one surface and positioned to rotate at an angle to the optical axis, as with the "butterfly" shutter of FIG. 2.

In some cameras a mirrored rotary shutter allows reflex viewing through the camera eyepiece whilst a separate rotary focal plane shutter, whose axis of rotation is set parallel to the optical axis, performs the function of masking the film during frame advancement, the focal plane shutter being driven in synchronism with the mirrored shutter. The rotary focal plane shutter is also generally in the form of a sector-shaped or butterfly-shaped opaque member, though not mirrored on one side.

Figure 2:
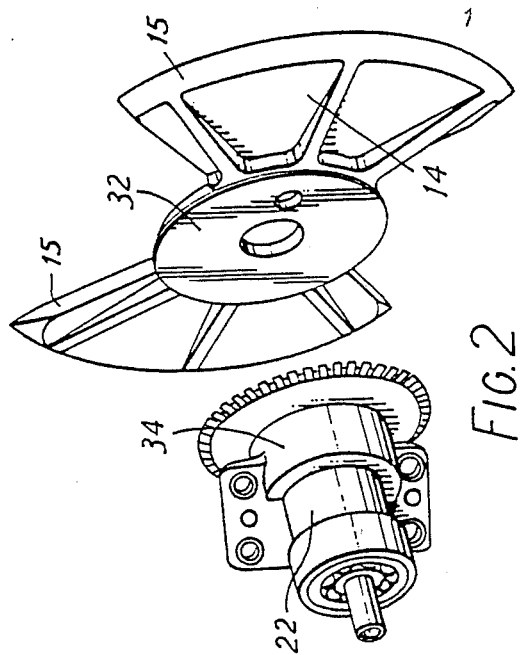
FIG. 2 shows a conventional "butterfly" shaped shutter used in the camera of FIG. 1.
Figure 3:
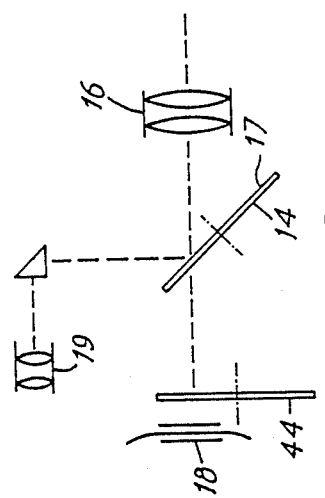
FIG. 3 is a diagrammatic plan view showing the layout of some components of the camera of FIG. 1.
Figure 1:
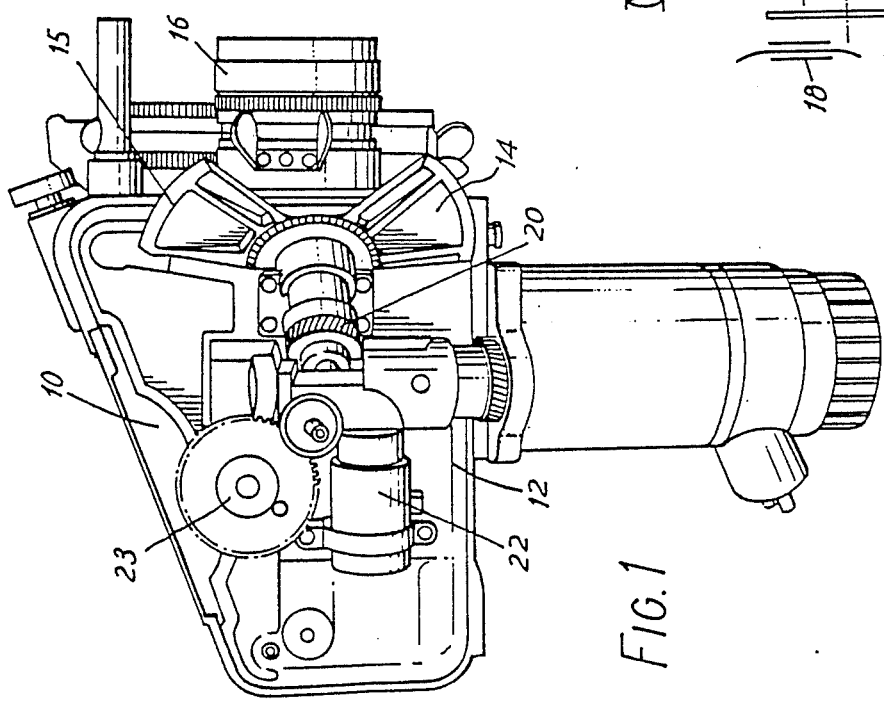
FIG. 1 is a diagrammatic drawing of a conventional film camera.

In operation of a camera employing a sector-shaped shutter such as shown in FIG. 4, the shutter 24 rotates once for each frame of the film (usually 24 to 25 times a second). In the case of cameras employing a "butterfly" shutter, as shown in FIGS. 1 and 2, the shutter 14 rotates once for every two frames of the film. The opaque portion of the shutter moves to a position between the lens 16 and the film, whilst the camera mechanism 23 advances the film to bring the next frame into position in the gate 18. The length of exposure of each frame is governed by the angle occupied by the open portion of the shutter, which is usually 180°, as shown in FIG. 4 but can be between about 10° and 230°. In the case of the "butterfly" shutter each open portion is usually 90° but may also be variable. Some cameras employ a variable shutter consisting of blades which can be adjusted to vary the angle of the shutter.

In accordance with one form of this invention, the mirrored rotary shutter 14, or the rotary focal plane shutter 44 of the conventional film camera, is replaced with a disc shutter designed to give rise to a number of images on each frame of the film.

In the embodiment shown in FIG. 5, the disc shutter 50 is designed to replace a sector-shaped shutter such as that of FIG. 4. The disc shutter 50 comprises a hub portion 51, an opaque shutter portion 52 and a transparent filter portion 54, 56, 58. The hub portion 51 is designed so that the disc shutter 50 can be fitted in the camera in the same way as the conventional shutter which it replaces. For example, it may be provided with appropriately positioned holes to receive bolts by means of which it is held in place in the camera. The opaque portion 52 occupies a 180° sector of the shutter 50, corresponding to the opaque portion 25 of the conventional shutter 24 of FIG. 4, and performs the same function as the opaque portion of the conventional shutter. If the disc shutter 50 is intended to replace a conventional mirrored rotary shutter, it may be mirrored on one surface so that replacement of the conventional shutter will not affect the view of the camera operator through the eyepiece. If the disc shutter 50 is intended to replace a rotary focal plane shutter, mirroring of the disc shutter is not necessary, since the additional mirrored rotary shutter providing the view through the eyepiece, remains unchanged.

The transparent portion of the disc shutter 50 consists of three filters, a red filter 54, a blue filter 56 and a green filter 58, each occupying an equal area or angular portion of the transparent portion. Thus, in the filter shown in FIG. 5, each filter occupies a 60° sector of the disc shutter.

The disc shutter 50 may for example consist of a glass disc, with the opaque portion suitably coated and filters laminated onto the transparent portion.

The disc shutter 50 is fitted into a conventional camera in place of the conventional sector-shaped shutter. In operation, the disc shutter 50 is driven to rotate at a constant speed so that the opaque portion 52 and the filters 54,56,58 pass successively between the lens 16 and the film gate 18. The film drive mechanism advances the film whilst the opaque portion 51 is passing between the lens 16 and gate 18, and holds each frame of the film stationary in the gate, at a position indicated diagrammatically at 48 in FIG. 5, as the filters 54,56 and 58 pass successively between the lens 16 and the gate 18. If the camera operates at 25 frames per second, so that the disc shutter rotates once in 1/25 seconds, the shutter speed, i.e. the period during which each frame of the film is exposed, is 1/50 second. Each of the filters 54,56,58 passes between the lens 16 and the film for one third of this time, so that each frame will be exposed to a red image for 1/150 second, a blue image for 1/150 second, and a green image for 1/150 second, in succession. These images are "overlaid" on each frame of the film. The three images recorded on each frame will usually represent different aspects of the scene being filmed, either because the camera moves during the 1/50 second exposure time, or because an object in the scene has moved, or a combination of the two.

The degree of disalignment between the three images caused by movement in the scene or movement of the camera 10 will depend on various interdependent factors, such as the speed of the movement, the closeness of the moving object to the camera 10, the focal length of the camera lens 16, and the angle of the transparent portion 54,56,58 of the shutter 50 i.e. the effective shutter speed.

To reproduce the image, the film is processed in the usual way and is projected onto a screen using conventional projection equipment. As described below, the film can be produced so that when projected it can be viewed without spectacles in the usual way. However, to enable the film to be seen with a stereoscopic effect, each member of the audience will usually be provided with a pair of spectacles 200 (FIG. 18), each lens of which consists of a color filter allowing transmission of light corresponding to a color complementary to one of the colors of the disc shutter in the camera together with part of the color complementary to the third color of the disc. For example, if, as described with reference to FIG. 5, the film is shot through red, blue and green filters 54,56,58, the lens 201 for the left eye may contain a cyan filter combined with a proportional yellow filter, with the lens 202 for the right eye containing a magenta filter combined with a proportional yellow filter. The left eye will then receive only green and blue light through the lens 201 and will see the green image and a partial blue image, but none of the red image. The right eye will receive only red and blue light through the lens 202 and will see the red image and a partial blue image but none of the green image.

Each eye will therefore see a different aspect of the scene, owing to movement in the scene or movement of the camera. The brain and eyes will recognise this as "dimensionality" and superimpose the images to constitute a stereoscopic image. Since the colors of the filters 54,56,58 in the disc 50 used in the camera 10, namely red, blue and green are sufficient, as in conventional color photography, to produce all colors, including white, the combination of the superimposed images will give a full color image.

As mentioned above, the disalignment between the three color images depends on various interdependent factors. At a given speed, an object passing in front of the camera lens 16 will give rise to a red image, a blue image and a green image. The disalignment of these images on the film will be proportionally greater if the images are exposed with a wider shutter angle (e.g. 210°) than with a narrower shutter angle (e.g. 30°). Therefore, for any given speed of movement, by varying the angle of the transparent part of the shutter 50, the degree of disalignment on each frame 48 of the film can be controlled. This gives the possibility of providing the camera operator with a number of different disc shutters with various shutter angles so that the appropriate shutter can be chosen for the kind of scene to be filmed. Alternatively, the shutter could be made with a removable filter insert, and provided with a series of inserts with different angles, so that to change the shutter speed it would be necessary only to change the shutter insert. There is also the possibility of providing a single leafed shutter with a variable shutter angle, as described below.

Figure 7:
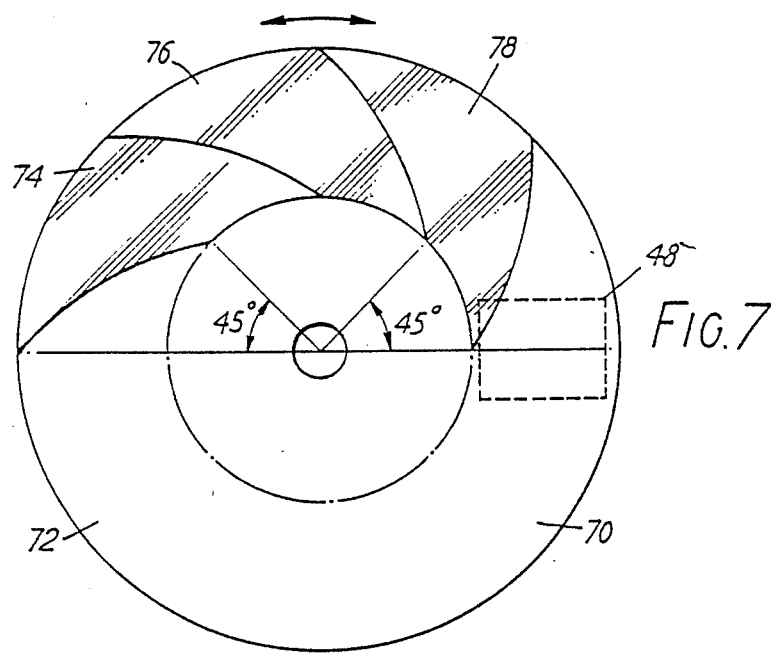
Figure 8:
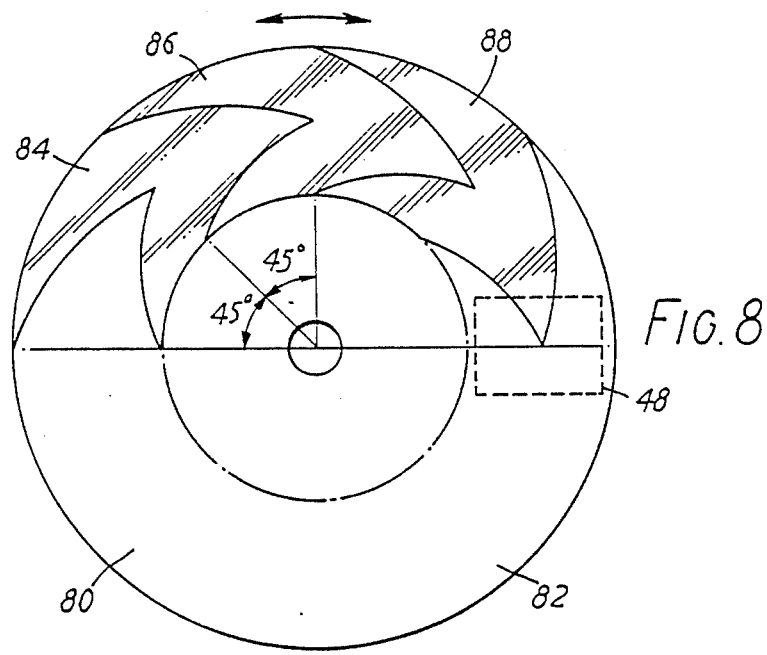
Figure 9:
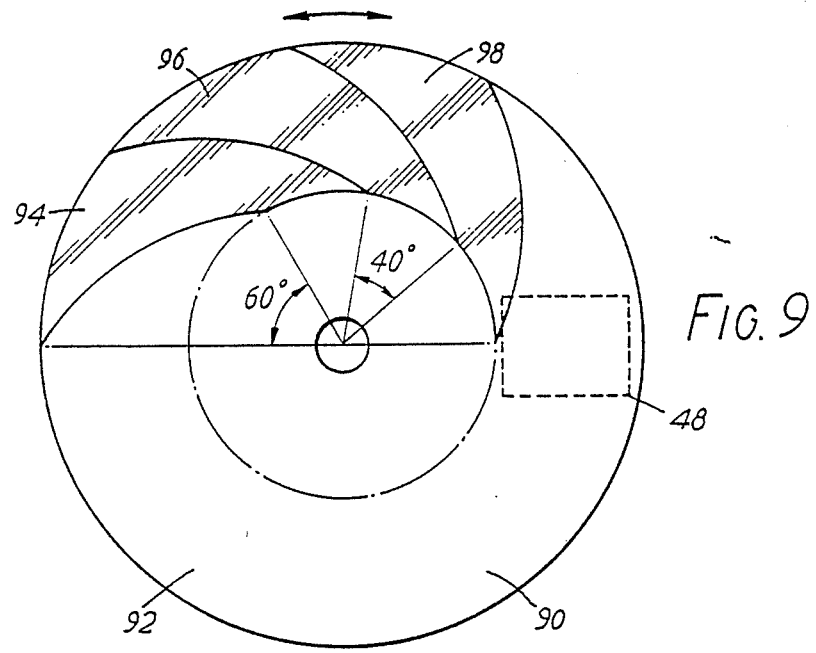

The degree of disalignment of the images can also be affected by varying the configuration of the filters within a given shutter angle. FIGS. 6 to 9 show various possible configurations utilising three filters, for example red, blue and green, whereby each color occupies an equal area of the transparent portion of the shutter member, the remaining angular portion being opaque. In the disc shutter 60 of FIG. 6, each of the red, blue and green filters 64,66 and 68, is in the shape of part of an annulus, and extends over an arc of 60° at the inner periphery 63 and over an arc of 60° at the outer periphery 65. However, the arc at the outer periphery 65 is displaced by 30° relative to the arc at the inner periphery 63, so that the shutter opening, whilst remaining effectively 180°, occupies 210° of rotation of the disc shutter. At the junction between the red filter 64 and the blue filter 66, since the boundary between the two extends spirally rather than radially, the parts of the red and blue filters extend over the common 30° arc of the shutter. There is a similar over-run between the blue filter 66 and the green filter 68. The shutter member 70 of FIG. 7 is similar, but each of the filters 74, 76 and 78 extends over 45° at the inner and outer peripheries, with a displacement of 45° between the inner and outer peripheries, so that the effective shutter opening is 135° occupying 180° of rotation of the shutter member. In the shutter member 80 of FIG. 8, each of the filters 84, 86 and 88 occupies 45° but in this case each boundary between adjacent filters, and between the outermost filters and the opaque portion of the shutter extends first through 45° in one circumferential direction and then through 45° in the opposite circumferential direction. The shutter member 90 of FIG. 9 is similar to that of FIGS. 6 and 7, with each of the filters 94, 96 and 98 extending over 40° at the inner and outer peripheries with 60° displacement between the inner and outer peripheries, so that the effective shutter opening is 120° occupying 180° of rotation of the shutter member. It will be appreciated that various other configurations of filters could be employed, and that these configurations could be used with any angle of shutter opening, e.g. 144° or 172.8°.

Figure 10:
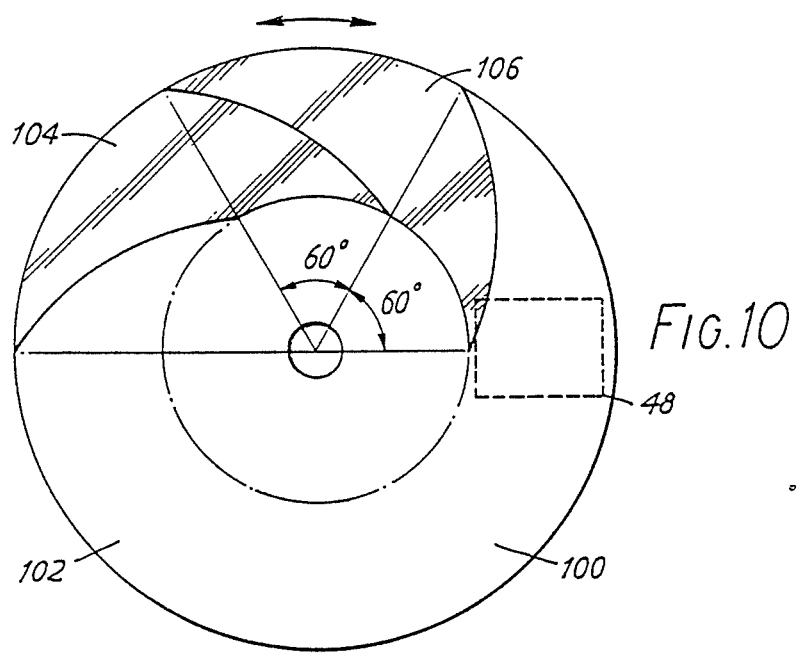
Figure 11:
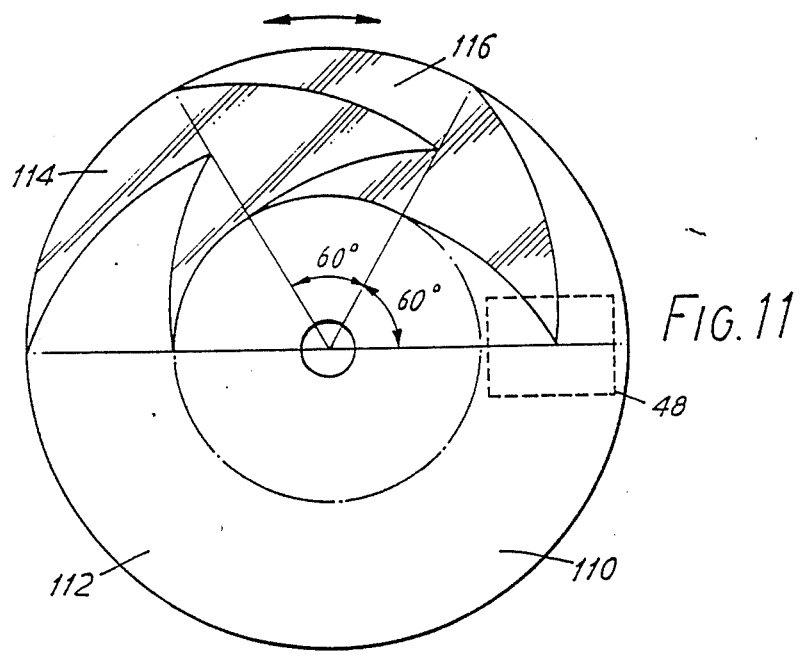

FIG. 10 shows a shutter member 100 similar to that of FIG. 6, but in which the three red, blue and green filters are replaced by two filters, 104 and 106, one transmitting red and a portion of blue, the other transmitting green and a portion of blue. FIG. 11 shows a shutter similar to that of FIG. 8, but with a red/blue filter 114 and a blue/green filter 116. The color filters thus arranged will allow equal proportions of red, blue and green light to reach the film on each frame, i.e. with each revolution of the shutter member.

Figure 12:
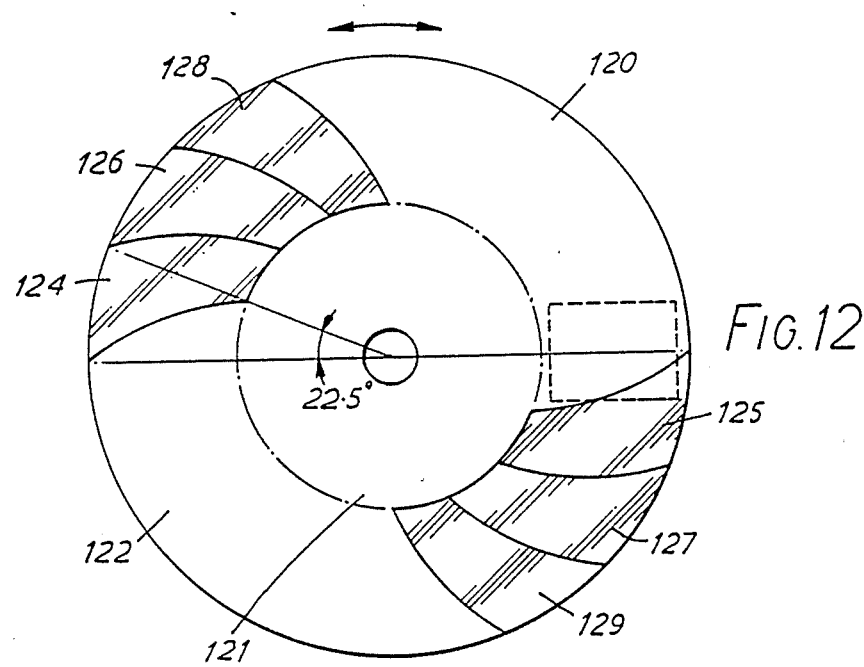

The disc shutters shown in FIGS. 5 to 11 are designed to replace a conventional sector-shaped shutter such as that shown in FIG. 4. It will be appreciated that disc shutters in accordance with the invention can also be designed to replace conventional "butterfly" shutters as shown in FIGS. 1 and 2, by providing two filter portions corresponding to the two open portions of the butterfly shutter. For example, FIG. 12 shows a disc shutter 120 having a hub portion 121, a first set of red, blue and green filters 124, 126, 128 forming one of the transparent portions of the shutter, a second set of red, blue and green filters 125, 127 and 129 forming the other transparent portion, and opaque portions 122 separating the transparent portions. The two sets of filters are arranged at diametrically opposite locations on the disc. The filters in each set occupy 22.5°, with a 22.5° displacement between the inner and outer peripheries, so that each transparent portion provides a shutter opening of 67.5° extending over 90° of the shutter. It will be appreciated that various other configurations could be provided. For example, the second set of filters could be arranged in the opposite order, i.e., filters 125, 127 and 129 being respectively green, blue and red.

Figure 13:
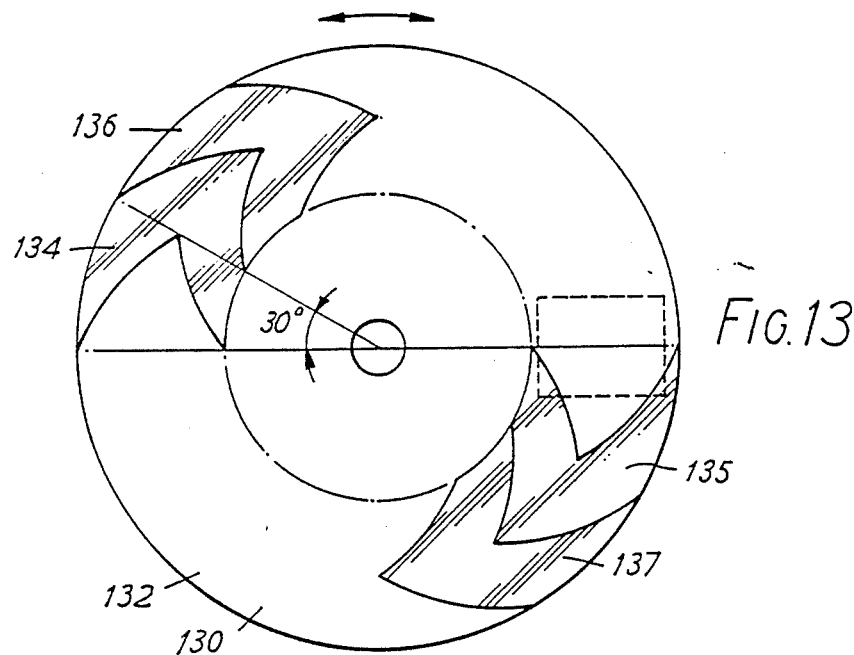

FIG. 13 shows a "butterfly" shutter 130 having two sets of filters, each consisting of a red/blue filter (134 or 135) and a blue/green filter (136 or 137). Each filter occupies 30°, with an "overlapping" of 30°, so that each set of filters occupies 90° of rotation and provides a 60° shutter opening, though other configurations could be provided.

The stereoscopic effect, when viewed with the appropriate spectacles as described above, and produced by disalignment of the images, will also directly be affected by the configuration of the filters. For example, using the shutter member of FIG. 7, when the shutter member 70 rotates anti-clockwise, the right-hand side of the frame 48 receives light of each color in advance of the left-hand side of the frame. If the shutter member 70 is reversed, or rotated clockwise, the left-hand side of the frame will receive light in advance of the right-hand side. In FIG. 8, if the shutter member 80 rotates anti-clockwise, both sides of the frame 48 receive light of each color in advance of the centre. If the shutter member 80 is reversed, or rotated clockwise, the centre of the frame 48 receives light of each color in advance of the sides of the frame.

The disalignment can also be reduced by blending each color into its adjacent colors at the boundaries between the filters.

If cross-polarising filters are used, for example each comprising 90° of the open side of the shutter, two images of opposing parallel grain can be overlaid on suitable film, the result to be viewed through cross-polarising spectacles. The cross-polarising filters can also be arranged in various configurations, as with the color filters described above.

Figure 16:
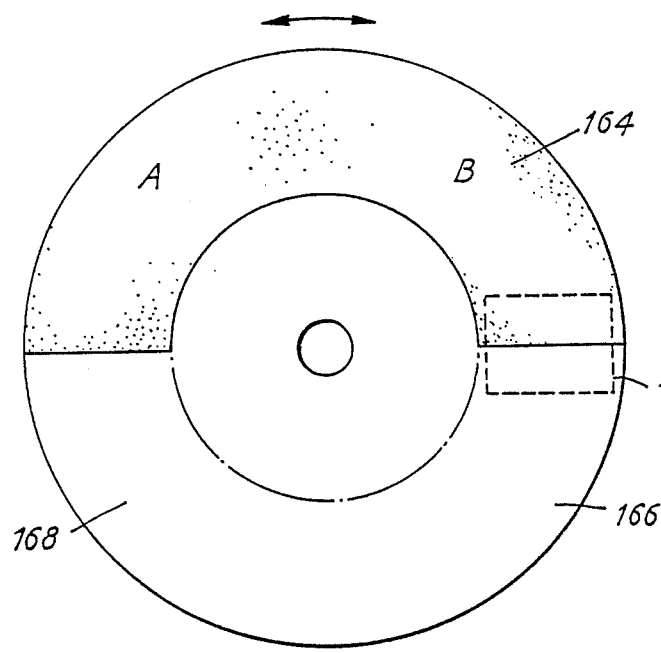

For example, in FIGS. 10, 11 or 13 the red/blue and blue/green filters could be replaced by cross-polarising filters. In the shutter member 166 of FIG. 16, a single linear polarising filter 164 is used, so that the plane of polarisation effectively rotates as the filter passes the frame 48 of the film, the remainder of the shutter 168 being opaque. In this case the reproduced film would be viewed, for example, through spectacles arranged to match the polarisation as points A and B of the filter pass the frame 48 of the film.

It is found that, using this invention, the accuracy and saturation of the color recorded onto each frame of the film is enhanced by being successively exposed through separate filters, e.g. red, blue and green, whose combination produces white light. Most modern film stock, i.e. integral tri-pack films suffers from overlapping color sensitivity, i.e. the red sensitive layer is also slightly sensitive to green light, etc. This leads to desaturation of the recorded color and, in some instances, to false colors being reproduced. When film is exposed, by means of the rotating shutter member described above, the sensitivity overlap is greatly reduced, leading to greatly improved saturation of the colors recorded and a reduction in the colors which will not record correctly.

The sharpness of the recorded image is also enhanced due to the effective division of each exposure of the film frame into, for example, three separate exposures, overlaid in different colors. The conventional rotating shutter produces a single exposure on each frame of the film. For example, with a shutter opening of 180° and a speed of 25 revolutions per second the shutter exposure on each frame is 1/50 second. When a rotatable shutter member in accordance with the invention is used, with the open portion equally divided by red, blue and green filters, each frame, at the same shutter speed and shutter angle, effectively receives three separate exposures of 1/50 second each. When the film is projected at normal speed, about 24 to 25 frames per second, the viewer sees a greater frequency of individually sharper images, this frequency closely imitating the speed at which the eye itself perceives reality. All the illustrated configurations of filters on the shutter member (FIGS. 5 to 16) will improve the sharpness in this way, although to different degrees. It is thus an advantage of the described system that because the separation between the overlaid images is relatively small, the film can be viewed without the use of spectacles. The film would appear in improved sharpness, and with the color filters of FIGS. 5 to 15 also in improved color, though the stereoscopic effect would diminish. Thus, although each member of the cinema audience would normally have a pair of spectacles, he or she can choose whether or not to wear the spectacles when watching the film. The film could also, for example, be shown on domestic television since the picture quality would be improved for those viewers who did not have, or chose not to use, the appropriate spectacles.

Other combinations of primary and secondary colors could be used for the disc shutter and spectacles. For example, the disc shutter could use cyan, magenta and yellow filters, the spectacle lenses having appropriate combinations of red, blue and green filters.

Figure 14:
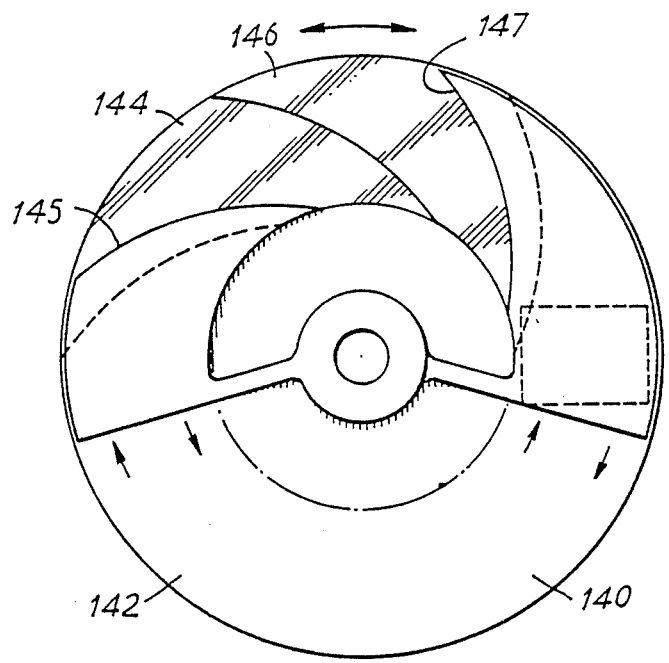

Whilst in the described embodiments using color filters the different color filters each occupy equal areas of the transparent part of the disc shutter, it will be appreciated that the different color filters could occupy different angular portions, for example to compensate for different transmissibilities of the different color filters. The disc shutter could be modified in other ways. For example the disc shutter could be made adjustable, with each of the filters formed of leaves, as well as the opaque part of the disc, so that when the shutter angle is adjusted each filter remains covering the same FIG. 14 shows one example of such a shutter, in which the disc shutter 140 has an opaque portion 142 and a transparent portion consisting of red/blue filter 144 and blue/green filter 146. An opaque leaf 145 is pivotally mounted so that it can be moved across the filter 144 to mask part of the filter as shown. As opaque leaf 147 is similarly movable to mask part of the filter 146. The two leaves 145 and 147 may be coupled so that they move simultaneously to ensure that both filters are masked to the same extent.

Figure 15:
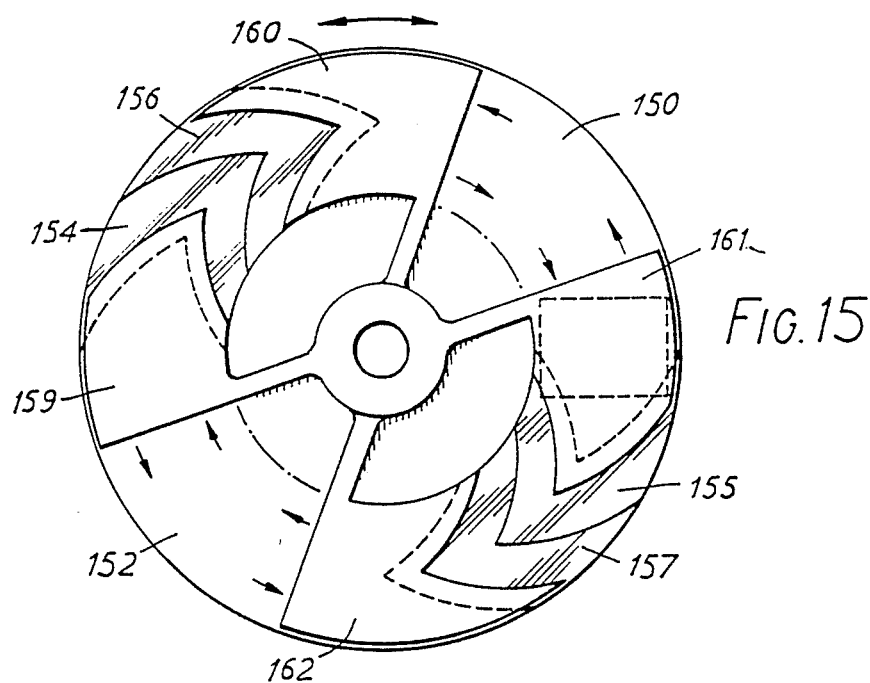

FIG. 15 shows a similar arrangement on a "butterfly" disc shutter 150, having two sets of filters 154, 156 and 155, 157. Two sets of opaque leaves 159, 160 and 161, 162 are arranged to move simultaneously to mask portions of each of the filters.

Suitable mechanisms could be provided for adjusting the position of the leaves. The mechanism may be arranged to allow the adjustment to be made whilst the disc shutter is in position in the camera, and possibly whilst the shutter is rotating, to enable the effective shutter speed to be adjusted during filming.

It will be appreciated that the described embodiments have the advantage that they use a camera which may be a relatively simple and inexpensive modification of a conventional film camera, avoiding the need for two cameras or two lens systems. Moreover, operation of the camera is the same as that for conventional, non-stereoscopic films.

The only modification which will normally be required in operation will be an increase in the camera aperture to compensate for the loss of light due to the presence of filters in the "open" portion of the disc shutter.

It will be appreciated from the various described embodiments that the choice and arrangement of filters in the disc shutter can take many forms. For example the transparent part of the disc could be divided into more than two or three sections. For example, two sets of the three color filters could be used, the transparent part of the disc, or each of the two transparent parts of a "butterfly" disc, being divided into six sections with the filter arranged in the sequence red-blue-green-red-blue-green. Other multiples or other sequences of the color filters could be used.

FIG. 17 illustrates an alternative embodiment of the invention, in which, instead of replacing the conventional mirrored rotary shutter or focal plane shutter, an additional disc shutter 170 is provided. The disc shutter 170 is mounted in front of the camera lens 16, or at any other suitable point in the optical path at which it will not affect the normal mechanical operation of the camera. The shutter 170 is driven by a drive mechanism 172 so that it rotates in synchronism with the camera shutter. The drive mechanism may, for example, be coupled to the camera drive mechanism, or may have a separate motor controlled to rotate the disc shutter 170 in synchronism with, though not necessarily at the same speed as the camera shutter. For example, shutter 170 may be rotated intermittently, with the transparent portion moving past the lens at a speed which may be varied to vary the effective shutter speed.

It will be appreciated that any of the embodiments of disc shutter shown in the drawings could be used in place of a mirrored shutter, a focal plane shutter, or as an additional shutter driven in synchronism with the camera shutter. Where the disc shutter is an additional shutter, as in FIG. 17, the portion of the disc shutter which would otherwise be opaque will usually need to be made transparent, so as not to interfere with the reflex viewing through the camera eyepiece.

A "butterfly" shutter could be provided with filters arranged in sequence red-blue-green in one filter portion and in the opposition sequence green-blue-red in the other filter portion, so that the sequence of image alternates with alternate frames of the film.

Other combinations and numbers of colors could be used in the filters. In some circumstances, a disc having a single color filter occupying part of the transparent portion of the shutter may be used, with the remainder being transparent to white light. More than three color filters could be used, or a single filter providing a continuous gradation of color over all or part of the visible spectrum.

The filters used in the disc shutter could take any suitable form. For example, in the disc shutter shown in FIG. 5, an embodiment has been made employing Kodak Wratten (trade marks) Gelatin filters, mounted on a glass disc. The filters used were Nos. 24 (red), 38 (blue) and 57 (green). Other forms of filter may be used, for example by sandwiching a birefringent material between polarising elements. In this case, instead of providing all the elements on the disc shutter, one of the polarising elements could be fixed in position, for example in front of the camera lens. Alternatively, both polarising elements could be fixed in position, with a birefringent element rotating between them.

Instead of using a rotating disc shutter, other means of interposing filters in the optical path of the camera could be provided. For example, the filters could be mounted on separate arms movable sequentially into and out of the optical path by a suitable drive mechanism. The spectacles may be made in different forms. For example, the spectacles may consist of a frame adapted to receive interchangeable lenses. Thus, the spectacles could be provided with a set of lenses having filters appropriate for viewing stereoscopic films as described above and with an alternative set of darkened lenses to enable the spectacles to be used as sun-glasses. The lenses could be provided in a "clip-on" frame to enable them to be attached to ordinary spectacles. The filters could be incorporated into corrective lenses. The lenses may be coated with a thin metallic layer, preferably of mercury, which acts, by a process of interference, to cause color separation to occur in the light passing through it. This intensifies the color separation produced by the filters. The coating may also have the effect, when the spectacles are worn in daylight, of providing a reflective surface so that the lenses appear similar to oridnary sun-glasses. The spectacles could be provided with audio units positioned in use next to the wearer's ears and adapted to be connected by a flexible cable to an outlet, for example on the cinema seat, so that the spectacles act also as stereophonic headphones.

I claim:

1. A method of recording onto cinematographic film an image of an object moving relative to the film, the method comprising the steps of:
  (a) forming onto each single frame of the film a plurality of partial images of the object taken at successive intervals of time;
  (b) said partial images being overlaid on each said frame and being displaced in position relative to one another owing to the relative movement between the object and the film in the or each time interval between the formation of the successive partial images;
  (c) said successive partial images being recorded in light of different colors;
  (d) said different colors being selected so that the overlaid partial images combine to form a full color image on reproduction of the image;
  (e) whereby, when the image is reproduced and viewed through filter spectacles allowing the left and right eyes of the viewer to see different ones of the partial images or different combinations thereof, a stereoscopic effect is obtained.

2. A method as claimed in claim 1, characterized by exposing each frame of the film successively to light of three different colors.

3. A method as claimed in claim 1, characterized by exposing each frame of the film successively to light of two different colors.

4. A method as claimed in claim 1, characterized by exposing each frame of the film through filters successively interposed in the optical path between the object and the film.

5. A moving color film camera, comprising:
  (a) a mechanism for interposing a number of color filters in an optical path of the camera succesively during the exposure of each single frame of the film, for forming onto each single frame of the film a plurality of partial images of an object moving relative to the film taken at successive intervals of time;
  (b) said partial images being formed by light passing through said color filters and being overlaid on each frame, said partial images being displaced in position relative to one another owing to the relative movement between the object and the film in the or each time interval between the formation of successive partial images;
  (c) said successive partial images being recorded in light of different colors;
  (d) said different colors being selected so that the overlaid partial images combine to form a full color image on reproduction of the image of the object;
  (e) whereby, when the image is reproduced and viewed through filter spectacles allowing the left and right eyes of the viewer to see different ones of the partial images or different combinations thereof, a stereoscopic effect is obtained.

6. A film camera as claimed in claim 5, characterized in that the mechanism comprises a movable member, the filters forming part of, or being carried by, the movable member, and means for moving the member so that the filters are brought successively into the optical path of the camera during exposure of each frame of the film.

7. A film camera as claimed in claim 6, characterized in that the camera is of the kind having a mirrored rotary shutter, or a mirrored rotary shutter coupled with a rotary focal plane shutter, and in that the said mechanism comprises a rotatable shutter member adapted to replace the mirrored rotary shutter, or the rotary focal plane shutter, the shutter member having an opaque portion and portions formed by the filters so that on rotation of the shutter member the opaque portion and the filters are moved successively into the optical path of the camera.

8. A film camera as claimed in claim 7, characterized in that the filters form adjacent sections of the transparent portion of the shutter member, divided by radii of the shutter member.

9. A film camera as claimed in claim 7, characterized in that the filters occupy adjacent sections of the transparent portion of the shutter member, the boundaries between adjacent filters being inclined to the radius of the shutter, for example extending spirally.

10. A film camera as claimed in claim 5, characterized in that three color filters are employed, the colors being selected to provide a full-color effect in the reproduced image.

11. A film camera as claimed in claim 5, characterized in that two color filters are employed, the colors of the two filters being selected to provide a full-color effect in the reproduced image.

* * * * *